United States Patent Office 3,021,221
Patented Feb. 13, 1962

3,021,221
PLASTICIZER FOR YEAST
John E. Farbak, Chicago, Ill., Harry Gebel, Hammond, Ind., and Paul Gibson, Chicago, Ill., assignors to Swift & Company, Chicago, Ill., a corporation of Illinois
No Drawing. Filed Dec. 9, 1959, Ser. No. 858,312
21 Claims. (Cl. 99—96)

The present invention relates in general to a plasticizing composition. More specifically, the invention is directed to an improved plasticizing and whitening agent for commercial yeast, to an improved yeast product containing the improved agent, and to a method for improving the quality, color, and water retention properties of the yeast product.

It is the aim of commercial baker's yeast manufacturers to produce a yeast product which is easily handleable during commercial packaging operations thereof, i.e., the product should not crumble during cutting and should be lubricated for easy extrusion. Other very desirable features of an improved yeast product are as white a color as possible and water retention to prevent water spotting, which is a tan discoloration of the yeast at areas where water has evaporated from the yeast surface.

In an effort to achieve a product possessing the desirable features discussed in the preceding paragraph, yeast manufacturers commonly employ a plsticizing composition. The plasticizing composition is usually incorporated into the yeast after the filtration step in the yeast manufacturing process. A measured quantity of the plasticizing composition is intimately mixed with the filtered yeast and water. The yeast is thereafter extruded and packaged.

The principal object of our invention is to produce a novel and particularly effective plasticizing composition.

An additional object of the invention lies in the provision of a yeast plasticizer which exhibits greatly increased ability to whiten yeast and prevent water spotting over the conventional yeast plasticizers.

A further object of the invention is the production of a yeast having improved cutting qualities and an improved color.

A still further object is to provide a novel and improved combination of ingredients which when placed in a suitable carrier will provide an improved plasticizing agent for yeast.

Still another object of the invention is to provide an improved yeast having incorporated therein a markedly improved plasticizing composition.

A further object is to provide a method for improving a yeast product by the addition thereto of an improved plasticizing composition.

Another object is to provide a method for producing a whiter colored yeast product having increased water retention properties.

An additional object is to provide a method for improving the quality of yeast, both during and after manufacture, i.e., providing for easy extrusion of the yeast into the desired form, improving the cutting qualities, providing a whiter cake of yeast, and preventing water spotting during storage.

Further objects and advantages of our invention will become apparent to those skilled in the art from a reading of the following description.

We have discovered that a combination of minor amounts of coconut oil, sodium lauryl sulfate, and a non-toxic fatty acid monoester of a polyhydric alcohol (wherein at least half the amount of the monoester is coconut oil monoglycerides) in a major amount of an edible vegetable triglyceride oil carrier produces an improved plasticizing composition which is unique in its ability to plasticize commercial yeast and impart thereto an improved color and freedom from water spotting.

The carrier oil should have a substantial amount of unsaturation. By "substantial amount" we mean that of the total fatty acids of the oil, at least 50% are unsaturated. Representative edible vegetable triglyceride oils which are particularly useful in our invention are corn oil, cottonseed oil, olive oil, palm oil, peanut oil, rice bran oil, sesame oil and soybean oil. Our preferred oil carrier is refined soybean oil.

The fatty acid monoester of a polyol can be composed of monoesters in addition to coconut oil monoglycerides. These are preferably monoesters of aliphatic alcohols containing more than one hydroxyl group and free of carboxyl groups. The diols, triols, tetritols and sugar alcohols are suitable polyols. When a mixture of monoesters is used at least half of the total amount of polyol monoester component should be coconut oil monoglycerides, and it is preferred that the proportion of coconut oil monoglycerides to other fatty acid monoesters range between about 1:1 up to about 10:1. In other words, when monoesters other than coconut oil monoglycerides are to be used the component thereof that is coconut oil monoglycerides should preferably be at least equal to and up to about ten times the amount of the other monoester.

The monoesters of coconut oil to which we refer include partial glycerides of coconut oil containing substantial amounts of monoglycerides, e.g., at least about 40% and up to about 100%. We prefer to use commercial monoglycerides of refined coconut oil. This commercial product is a mixture of approximately 40–60% monoglycerides, 30–50% diglycerides, and 10–20% triglycerides. Coconut oil partial glycerides containing greater amounts of monoglycerides than this commercial product are very effective but are not deemed sufficiently more effective to justify the presently applied additional cost.

The compositions of our invention preferably contain, by weight, the following approximate percentages of ingredients: as a carrier base oil, an edible vegetable triglyceride oil having a substantial amount of unsaturation, 50–70%; and as ingredients providing a synergistic whitening effect and water retention properties, the following: coconut oil 5–20%, sodium lauryl sulfate 0.5–2%, with the remainder being a fatty acid monoester of a polyol. When the monoester is composed of another fatty acid monoester in addition to coconut oil monoglycerides, it is preferred that about 15–30% of the remainder mentioned above be coconut oil monoglycerides and about 3–15% be another fatty acid monoester.

Representative fatty acid monoesters of polyols that we have found to be especially effective are sorbitan monoesters of long chain fatty acids, coconut oil monoglycerides and other glycerol monoesters of long chain fatty acids and mixtures thereof. The fatty acids preferably are saturated and monounsaturated fatty acids containing 12–18 carbons. Particularly suitable monoesters, in addition to coconut oil monoglycerides, are glyceryl monostearate, glyceryl monooleate, glyceryl monopalmitate, glyceryl monolaurate, sorbitan monostearate, sorbitan monooleate, sorbitan monopalmitate, and sorbitan monolaurate. When using a mixture of monoesters, our preferred monoesters are coconut oil monoglycerides and glyceryl monooleate.

Sodium lauryl sulfate together with the monoesters acts to impart the increased water retention properties to the yeast containing our plasticizing composition. Additionally, the monoesters together with the coconut oil provide the marked improvement in whiteness of the yeast. The ingredients of our plasticizer are dispersible in cold water. This is an additional advantage allowing for extrusion of the yeast at lower temperatures than are normally employed.

The purpose of refining edible triglyceride oils is to produce a substantially colorless, odorless, and degummed oil. These oils are conventionally either alkali refined, deodorized and bleached, or are propane refined. In propane refining the gums are removed by separation thereof as the bottoms fraction by fractionation in liquefied propane at a ratio of 15-35 parts propane to one part oil, a temperature of between 150-180° F., and at a pressure of from 520-600 p.s.i.g. In using the term "refined" in this application, we mean to include oils having the properties mentioned above, regardless of the method by which these properties were obtained.

Our improved plasticizer is added to yeast at the normal time for adding such a material in yeast processing. It is added in the range of about 0.20-1.5% by weight of the yeast with perhaps about 1.0% being preferred. The following examples illustrate the compositions of our invention and are provided as illustration only and not as limiting the scope of the invention.

*Example I*

| | Percent |
|---|---|
| Refined soybean oil | 70 |
| Refined coconut oil | 10.5 |
| Partial glycerides of refined coconut oil | 15 |
| Glyceryl monooleate | 4 |
| Sodium lauryl sulfate | 0.5 |

*Example II*

| | |
|---|---|
| Refined soybean oil | 60 |
| Refined coconut oil | 20 |
| Partial glycerides of refined coconut oil | 18.5 |
| Sodium lauryl sulfate | 1.5 |

*Example III*

| | |
|---|---|
| Refined soybean oil | 64 |
| Refined coconut oil | 10 |
| Partial glycerides of refined coconut oil | 20 |
| Sorbitan monostearate | 5 |
| Sodium lauryl sulfate | 1 |

*Example IV*

| | |
|---|---|
| Refined soybean oil | 50 |
| Refined coconut oil | 15 |
| Partial glycerides of refined coconut oil | 25 |
| Glyceryl monopalmitate | 8 |
| Sodium lauryl sulfate | 2 |

The following examples illustrate the improved yeast product that is obtained when yeast is plasticized with our improved composition.

*Example V*

0.20%, by weight of the yeast, of the composition of Example I was thoroughly mixed with filtered yeast and water. The yeast was extruded at approximately 50° F. and packaged. The plasticized yeast did not crumble during cutting and was easily extruded. It was found to have an exceptionally white color and substantially no tan discoloration due to water spotting after storage.

*Example VI*

One percent, by weight of the yeast, of the following plasticizers:

A. Combination of vegetable oil and glyceryl monostearate (commercial product)
B. Combination of vegetable oil, glyceryl monostearate and sulfated soybean oil (commercial product)
C. The composition of Example I
D. The composition of Example II
E. The composition of Example III
F. The composition of Example IV was mixed with samples of filtered yeast and water and the samples were respectively lettered samples A-F. The yeast was extruded at approximately 50° F. and packaged.

The samples were compared for color on a color scale from 0-10, 10 being the designation for white, 0 being the designation for grey, and the numbers therebetween indicating variations in shade between the two (e.g. about 4-6 are labeled cream). The samples were graded by a color panel and rated as follows.

| Sample: | Color |
|---|---|
| A | 0 |
| B | 2 |
| C | 10 |
| D | 9 |
| E | 9 |
| F | 8+ |

A comparison between the samples was also made with regard to water spotting. The comparison is made on the basis of the percentage of the surface of the yeast that is discolored by water spotting after one week of storage at 40° F. The comparison gave the following results.

| Sample: | Yeast surface, percent discolored |
|---|---|
| A | 90 |
| B | 65 |
| C | 1 |
| D | 3 |
| E | 9 |
| F | 4 |

Obviously many modifications and variations of the invention as hereinbefore set forth may be made without departing from the spirit and scope thereof, and therefore only such limitations should be imposed as are indicated in the appended claims.

We claim:

1. A composition adapted for incorporation in an edible vegetable triglyceride oil having a substantial amount of unsaturation which comprises: coconut oil, sodium lauryl sulfate, and a fatty acid monoester of a polyhydric alcohol, at least half the amount of said monoester being monoglycerides of coconut oil.

2. A composition of matter comprising an edible vegetable triglyceride oil having a substantial amount of unsaturation as the major ingredient and, as minor ingredients, coconut oil, sodium lauryl sulfate, and a fatty acid monoester of a polyhydric alcohol, at least half the amount of said monoester being monoglycerides of coconut oil.

3. A composition of matter comprising an edible vegetable triglyceride oil having a substantial amount of unsaturation as a major ingredient and, as minor ingredients, coconut oil, sodium lauryl sulfate, and fatty acid esters of polyols, said esters comprising monoglycerides of coconut oil and another fatty acid monoester, the amount of said monoglycerides being at least equal to and up to about ten times the amount of the other monoester.

4. A composition of matter comprising a mixture of ingredients in approximately the following percentages by weight: 50-70% of an edible vegetable triglyceride oil having a substantial amount of unsaturation, 5-20% refined coconut oil, 0.5-2% sodium lauryl sulfate, and the remainder fatty acid monoester of a polyhydroxy alcohol, at least half the amount of said monoester being coconut oil monoglycerides.

5. A composition of matter comprising a mixture of ingredients in approximately the following parts by weight: 50-70 parts refined soybean oil, 5-20 parts refined coconut oil, 0.5-2 parts sodium lauryl sulfate, 18-45 parts fatty acid esters of a polyol, said esters comprising about 15-30 parts coconut oil monoglycerides and about 3-15 parts of another fatty acid monoester.

6. The composition of claim 5 wherein the other fatty acid monoester is selected from the group consisting of glyceryl monostearate, glyceryl monooleate, glyceryl monopalmitate, glyceryl monolaurate, sorbitan monostearate, sorbitan monooleate, sorbitan monopalmitate, sorbitan monolaurate and mixtures thereof.

7. A composition of matter comprising a mixture of ingredients in approximately the following parts by weight: 50-70 parts refined soybean oil, 5-15 parts refined coconut oil, 0.5-2 parts sodium lauryl sulfate, 18-45 parts fatty acid esters of a polyol, said esters comprising about 15-30 parts coconut oil monoglycerides and about 3-15 parts glyceryl monooleate.

8. A composition of matter which comprises a mixture in the following approximate proportions by weight: refined soybean oil, 70 parts; refined coconut oil, 10.5 parts; sodium lauryl sulfate, 0.5 part; monoglycerides of refined coconut oil, 15 parts; glycerol monooleate, 4 parts.

9. A composition of matter comprising yeast plasticized by a composition comprising an edible vegetable triglyceride oil having a substantial amount of unsaturation as a major ingredient and, as minor ingredients, coconut oil, sodium lauryl sulfate, and a fatty acid monoester of a polyhydric alcohol, at least half of the amount of said monoester being monoglycerides of coconut oil.

10. A composition of matter comprising yeast plasticized by a composition comprising an edible vegetable triglyceride oil having a substantial amount of unsaturation as a major ingredient and, as minor ingredients, coconut oil, sodium lauryl sulfate, and fatty esters of polyols, said esters comprising monoglycerides of coconut oil and another fatty acid monoester, the amount of said monoglycerides being at least equal to and up to about ten times the amount of the other monoester.

11. A composition of matter comprising yeast plasticized by a composition comprising a mixture of ingredients in approximately the following percentages by weight: 50-70% refined soybean oil, 5-15% coconut oil, 0.5-2% sodium lauryl sulfate, and the remainder fatty acid monoester of a polyhydric alcohol, at least half of said monoester being coconut oil monoglycerides.

12. A composition of matter comprising yeast plasticized by a composition comprising a mixture of ingredients in approximately the following parts by weight: 50-70 parts refined soybean oil, 5-15 parts refined coconut oil, 0.5-2 parts sodium lauryl sulfate, and 18-45 parts fatty acid esters of a polyol, said esters comprising about 15-30 parts coconut oil monoglycerides and 3-15 parts of a fatty acid monoester selected from the group consisting of glyceryl monostearate, glyceryl monooleate, glyceryl monopalmitate, glyceryl monolaurate, sorbitan monostearate, sorbitan monooleate, sorbitan monopalmitate, sorbitan monolaurate and mixtures thereof.

13. The composition of claim 12 wherein the fatty acid monoester is glyceryl monooleate.

14. A composition of matter comprising yeast plasticized by a composition comprising a mixture in the following approximate proportions by weight: refined soybean oil, 70 parts; refined coconut oil, 10.5 parts; sodium lauryl sulfate, 0.5 part; monoglycerides of refined coconut oil, 15 parts; glyceryl monooleate, 4 parts.

15. A method for improving yeast which comprises incorporating therein a small amount of a composition comprising an edible vegetable triglyceride oil having a substantial amount of unsaturation as the major ingredient and, as minor ingredients, coconut oil, sodium lauryl sulfate, and a fatty acid monoester of a polyhydric alcohol, at least half the amount of said monoester being monoglycerides of coconut oil.

16. A method for improving yeast which comprises incorporating therein a small amount of a composition comprising an edible vegetable triglyceride oil having a substantial amount of unsaturation as a major ingredient and, as minor ingredients, coconut oil, sodium lauryl sulfate, and fatty acid esters of polyols, said esters comprising monoglycerides of coconut oil and another fatty acid monoester, the amount of said monoglycerides being at least equal to and up to about ten times the amount of the other monoester.

17. A method for improving the quality of yeast which comprises incorporating therein at least about 0.05% by weight of the yeast of a mixture of ingredients in approximately the following percentages by weight: 50-70% refined soybean oil, 5-15% refined coconut oil, 0.5-2% sodium lauryl sulfate, and the remainder fatty acid esters of a polyol, said esters comprising about 15-30% coconut oil monoglycerides and about 3-15% of a fatty acid monoester from the group consisting of glyceryl monostearate, glyceryl monooleate, glyceryl monopalmitate, glyceryl monolaurate, sorbitan monostearate, sorbitan monooleate, sorbitan monopalmitate, sorbitan monolaurate, and mixtures thereof.

18. A method for improving the quality of yeast which comprises: incorporating therein between about 0.05-0.20%, by weight of the yeast, of a mixture in the following proportions by weight: refined soybean oil, 70 parts; refined coconut oil, 10.5 parts; sodium lauryl sulfate, 0.5 part; monoglycerides of refined coconut oil, 15 parts; glyceryl monooleate, 4 parts.

19. A method for improving the water-retention properties and color of yeast which comprises: forming a mixture of ingredients in the following approximate parts by weight, 70 parts refined soybean oil, 10.5 parts coconut oil, 15 parts coconut oil monoglycerides, 4 parts glyceryl monooleate, and 0.5 parts sodium lauryl sulfate; and intimately mixing at least about 0.5% of the so-formed mixture with filtered yeast and water, the percentage of said so-formed mixture being based on the weight of the yeast.

20. The method of imparting improved yeast plasticizing properties to an edible vegetable triglyceride oil having a substantial amount of unsaturation which comprises: incorporating in said oil from 30-50 parts, by weight, of a mixture of coconut oil, sodium lauryl sulfate, and a fatty acid monoester of a polyhdric alcohol, at least half the amount of said monoester being monoglycerides of coconut oil.

21. A composition adapted for incorporation in an edible vegetable triglyceride oil having a substantial amount of unsaturation which comprises 7-40% coconut oil by weight of said triglyceride oil, 0.7-4% sodium lauryl sulfate by weight of said triglyceride oil, and 25.7-90% fatty acid monoesters of a polyhydric alcohol, at least half the amount of said monoesters being partial glycerides of coconut oil.

References Cited in the file of this patent
UNITED STATES PATENTS 2,223,465    Schultz et al.    Dec. 3, 1940
2,830,906    Farbak et al.    Apr. 15, 1958

UNITED STATES PATENT OFFICE
CERTIFICATE OF CORRECTION

Patent No. 3,021,221            February 13, 1962

John E. Farbak et al.

It is hereby certified that error appears in the above numbered patent requiring correction and that the said Letters Patent should read as corrected below.

Column 1, line 27, for "plsticizing" read -- plasticizing --; column 6, line 39, for "0.5%" read -- 0.05% --.

Signed and sealed this 26th day of June 1962.

(SEAL)
Attest:

ERNEST W. SWIDER
Attesting Officer

DAVID L. LADD
Commissioner of Patents